US010836640B2

(12) United States Patent
Tang et al.

(10) Patent No.: US 10,836,640 B2
(45) Date of Patent: Nov. 17, 2020

(54) COMPOSITE CONTAINING CARBON NANOSTRUCTURE, HIGH MOLECULAR MATERIAL USING SAME AND PREPARATION METHOD

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); Yingfu Zheng, Shandong (CN); Xiaomin Liu, Shandong (CN); Ding Liu, Shandong (CN)

(73) Assignee: JINAN SHENGQUAN GROUP HOLDING CO. LTD., Shandong (CN)

( * ) Notice: Subject to any disclaimer, the term of this patent is extended or adjusted under 35 U.S.C. 154(b) by 180 days.

(21) Appl. No.: 15/521,534

(22) PCT Filed: Sep. 22, 2016

(86) PCT No.: PCT/CN2016/099750
§ 371 (c)(1),
(2) Date: Apr. 24, 2017

(87) PCT Pub. No.: WO2017/063492
PCT Pub. Date: Apr. 20, 2017

(65) Prior Publication Data
US 2018/0273387 A1     Sep. 27, 2018

(30) Foreign Application Priority Data

Oct. 15, 2015  (CN) .......................... 2015 1 0672279
Nov. 20, 2015  (CN) .......................... 2015 1 0819312

(51) Int. Cl.
| | |
|---|---|
| C01B 32/182 | (2017.01) |
| B82Y 30/00 | (2011.01) |
| C08K 3/04 | (2006.01) |
| C08K 3/08 | (2006.01) |
| B82Y 40/00 | (2011.01) |

(52) U.S. Cl.
CPC ............ *C01B 32/182* (2017.08); *B82Y 30/00* (2013.01); *C08K 3/04* (2013.01); *C08K 3/08* (2013.01); *B82Y 40/00* (2013.01); *C08K 2003/0812* (2013.01); *C08K 2003/0856* (2013.01)

(58) Field of Classification Search
CPC ....... C01B 32/182; B82Y 30/00; B82Y 40/00; C08K 3/04; C08K 3/08; C08K 2003/0812; C08K 2003/0856
USPC ....................................................... 428/323
See application file for complete search history.

(56) References Cited

U.S. PATENT DOCUMENTS

| | | | |
|---|---|---|---|
| 2011/0014111 A1 | 1/2011 | Leugers et al. | |
| 2012/0000845 A1* | 1/2012 | Park ................... | B01D 67/0041 |
| | | | 210/500.25 |
| 2017/0137293 A1* | 5/2017 | Tang ................... | C01B 32/184 |
| 2018/0327567 A1 | 11/2018 | Tang et al. | |

FOREIGN PATENT DOCUMENTS

| | | | |
|---|---|---|---|
| CN | 101618870 A | | 1/2010 |
| CN | 102142558 A | * | 8/2011 |
| CN | 102142558 A | | 8/2011 |
| CN | 102306757 A | | 1/2012 |
| CN | 102530928 A | | 7/2012 |
| CN | 103046151 A | | 4/2013 |
| CN | 103131018 A | | 6/2013 |
| CN | 103466613 A | | 12/2013 |
| CN | 103508444 A | | 1/2014 |
| CN | 103579596 A | | 3/2014 |
| CN | 103647043 A | | 3/2014 |
| CN | 103691446 A | | 4/2014 |
| CN | 103898782 A | | 8/2014 |
| CN | 104009235 A | | 8/2014 |
| CN | 104016341 A | | 9/2014 |

(Continued)

OTHER PUBLICATIONS

J. Hong et al., "Origin of New Broad Raman D and G Peaks in Annealed Graphene", Sci. Rep., 3, 2700; DOI:10.1038/srep02700 (2013). (Year: 2013).*
Genovese, M., Jiang, J., Lian, K., and Holm, N. (2015). High capacitive performance of exfoliated biochar nanosheets from biomass waste corn cob. Journal of Materials Chemistry A, pp. 2903-2913, DOI: 10.1039/c4a06110a.
International Preliminary Report on Patentability issued in PCT/CN2016/104933 [English translation included], dated May 31, 2018, 17 pages.
International Preliminary Report on Patentability issued in PCT/CN2016/105641 [English translation inclusive], dated May 31, 2018, 12 pages.

(Continued)

*Primary Examiner* — Ronald Grinsted
(74) *Attorney, Agent, or Firm* — Faegre Drinker Biddle & Reath LLP

(57) ABSTRACT

The present invention relates to a composite having a carbon nanostructure, comprising graphene, amorphous carbon and a non-carbon non-oxygen element, wherein the non-carbon non-oxygen element is in an amount of 0.5 wt %-6 wt % of the composite. The present invention discloses controlling the content of the non-carbon non-oxygen element in the composite to obtain excellent far-infrared effect and antibacterial and bacteriostatic effects, wherein the normal emissivity in the far-infrared performance reaches 0.85 or more, and the antibacterial rate reaches 95% or more. The composite having a carbon nanostructure of the present invention is applied to macromolecular materials to modify macromolecular materials under the circumstance that the addition amount is relatively low. The composite having a carbon nanostructure can achieve notable far-infrared performance and antibacterial and bactericidal performances without any pre-modification and activation treatment.

16 Claims, 2 Drawing Sheets

(56) References Cited

FOREIGN PATENT DOCUMENTS

| | | | | |
|---|---|---|---|---|
| CN | 104016341 A | * | 9/2014 | ........... C01B 32/182 |
| CN | 104118873 A | | 10/2014 | |
| CN | 104118874 A | | 10/2014 | |
| CN | 104164707 A | | 11/2014 | |
| CN | 104177766 A | | 12/2014 | |
| CN | 104194252 A | | 12/2014 | |
| CN | 104211058 A | | 12/2014 | |
| CN | 104231539 A | | 12/2014 | |
| CN | 104292745 A | | 1/2015 | |
| CN | 104328523 A | | 2/2015 | |
| CN | 104332613 A | | 2/2015 | |
| CN | 104562276 A | | 4/2015 | |
| CN | 104610557 A | | 5/2015 | |
| CN | 104724699 A | | 6/2015 | |
| CN | 104787750 A | | 7/2015 | |
| CN | 104817746 A | | 8/2015 | |
| CN | 104831389 A | | 8/2015 | |
| CN | 104891479 A | | 9/2015 | |
| CN | 105037835 A | | 11/2015 | |
| CN | 105502330 A | | 4/2016 | |
| CN | 105504341 A | | 4/2016 | |
| CN | 105525384 A | | 5/2016 | |
| CN | 105586658 A | | 5/2016 | |
| CN | 105603568 A | | 5/2016 | |
| CN | 105623002 A | | 6/2016 | |
| CN | 102732037 A | | 4/2017 | |
| KR | 20120063857 A | | 6/2012 | |
| KR | 20120082287 A | | 7/2012 | |
| RU | 2470699 C1 | * | 12/2012 | ......... B01D 67/0041 |
| RU | 2470699 C1 | | 12/2012 | |
| WO | 2010107762 A1 | | 9/2010 | |

OTHER PUBLICATIONS

Pinto, J., Cruz, et al. (2012). Characterization of corn cob as a possible raw building material. Construction and Building Materials, 34:28-33.

Written Opinion issued in PCT/CN2016/105641 [English translation inclusive], dated Feb. 17, 2017, 9 pages.

Written Opinion of the International Searching Authority issued PCT/CN2016/104933 [English translation included], dated Jan. 24, 2017, 15 pages.

International Search Report and Written Opinion issued in PCT/CN2016/093115, dated Sep. 21, 2016, 6 pages.

International Search Report and Written Opinion issued in PCT/CN2016/099750 with Translation of ISR, dated Dec. 29, 2016, 16 pages.

International Search REport iossued in PCT/CN2016/106435, dated Feb. 17, 2017, 4 pages.

International Search Report issued in PCT/CN2016/104933, dated Jan. 24, 2017, 4 pages.

International Search Report issued in PCT/CN2016/105641, dated Feb. 17, 2017, 6 pages.

International Search Report issued in PCT/CN2016/106434, dated Feb. 23, 2017, 4 pages.

Office Action issued in Russian patent application No. 2017129230/5, dated Dec. 24, 2018 (With English translation), 13 pages.

* cited by examiner

COMPOSITE CONTAINING CARBON NANOSTRUCTURE, HIGH MOLECULAR MATERIAL USING SAME AND PREPARATION METHOD

CROSS-REFERENCE TO RELATED APPLICATION

This application is a national phase application of PCT Application No. PCT/CN2016/099750, internationally filed Sep. 22, 2016, which claims priority to Chinese Application 2015 10 672 279.2, filed Oct. 15, 2015, and Chinese Application 2015 10 819 312.X, filed Nov. 20, 2015, all of which are herein incorporated by reference in their entirety.

TECHNICAL FIELD

The present invention relates to the technical field of materials, especially to a composite and a process for preparing the same, as well as a macromolecular material and a process for preparing the same.

BACKGROUND

Nanocarbon material refers to carbon materials having at least one dimension of the dispersion phase dimensions of less than 100 nm. Dispersion phase may consist of carbon atoms, or heterogeneous atoms (non-carbon atoms), or even nanopores. Nanocarbon material primarily comprises carbon nanotubes, carbon nanofibers, nanocarbon spheres and graphene.

Graphene is a single-layered sheet-like structure composed of carbon atoms. Graphene is almost completely transparent, absorbs only 2.3% of light, and has a thermal conductivity of 5300 W/m·K which is higher than those of carbon nanotubes and diamonds. Graphene has an electron mobility of more than 15000 $cm^2/V \cdot s$ at room temperature, which is higher than those of carbon nanotubes or silicon crystals. Graphene has a resistivity of only $10^{-8}$ $\Omega \cdot m$, which is lower than that of copper or silver, and it is the lowest resistivity material in the world. Because graphene has the advantages of good transparency, small resistivity and fast electron mobility, it can be used to make transparent touch screens, light boards, and solar cells.

Currently, graphene is prepared primarily by mechanical stripping method, chemical vapor deposition method, pyrolytic epitaxial growth method and the like, wherein the chemical vapor deposition method is easy and simple and can be used to obtain large area of high-quality graphene. Although the prior art documents disclose preparing graphene by using biomass raw materials, it focuses on getting graphene having a higher purity and having a higher sp2 hybridization degree, a thin lamella, and a high conductivity. Moreover, the technical knowledge of graphene in the prior art involves that, the higher the purity of graphene is, the better it is.

During the application of graphene prepared by the preparation processes of the prior art, especially applications in which the graphene is introduced to a macromolecular material to modify the macromolecular material, the graphene generally needs to be pre-modified or activated in order to make it better bind with the macromolecular material, and so as to make the surface of graphene have enough active functional groups or make graphene a better compound with the macromolecular material to achieve the characteristics which graphene could bring.

SUMMARY

To this end, the technical problem to be solved by the present invention lies in providing a composite and a process for preparing the same, a macromolecular material and a process for preparing the same, wherein the composite has excellent far-infrared effect and antibacterial and bacteriostatic effects.

The first object of the present invention provides a composite having a carbon nanostructure, wherein the composite comprises graphene, amorphous carbon and a non-carbon non-oxygen element, wherein the non-carbon non-oxygen element comprises elements of Fe, Si, and Al, and is in an amount of 0.5 weight percent (wt %)-6 wt % of the composite.

As to the composite having a carbon nanostructure, the typical but non-limitative examples may be any one selected from the group consisting of substance ①, substance ②, substance ③, or substance ④ having the performances as stated in Table A, or a combination of at least two selected therefrom.

TABLE A

| Items | Performance indexes | | | |
| --- | --- | --- | --- | --- |
| | Substance ① | Substance ② | Substance ③ | Substance ④ |
| Conductivity, S/m | 2800-8000 | 5000-8000 | 2800-4000 | 3000-8000 |
| Specific surface area, $m^2/g$ | ≥150 | ≥150 | ≥300 | ≥250 |
| Raman spectrum, IG/ID | ≥2.0 | ≥3.0 | ≥2.0 | ≥2.0 |
| C/O | ≥35.0 | ≥40.0 | ≥35.0 | ≥40.0 |
| Ash, % | 1.0-4.0 | 2.0-4.0 | 1.0-2.5 | 1.0-2.0 |
| Fe, % | 0.1-0.5 | 0.1-0.5 | 0.1-0.5 | 0.1-0.5 |
| Si, % | 0.05-0.3 | 0.05-0.3 | 0.05-0.3 | 0.05-0.3 |
| Al, % | 0.05-0.4 | 0.05-0.4 | 0.05-0.4 | 0.05-0.4 |

In Table A, IG/ID represents the peak height ratio of the G peak and D peak in the Raman spectrum.

Those skilled in the art should know that the performance indexes of the composite having a carbon nanostructure listed in Table A all refer to the indexes of the powder of the composite having a carbon nanostructure; if the composite having a carbon nanostructure is a slurry, the aforesaid indexes are the indexes of the powder before the slurry is prepared.

When the composite having a carbon nanostructure is in a powder form, besides having the performance indexes in Table A, it also has the following characteristics of black powder, homogeneous fineness, no significant large particles, a water content of 3.0% or less, a particle size D90 of 10.0 μm or less, a pH of 5.0-8.0 and an apparent density of 0.2-0.4 $g/cm^3$.

When the composite having a carbon nanostructure is a slurry, it is a product obtained by dispersing the composite having a carbon nanostructure in a solvent, which, besides having the performance indexes in Table A, has the following characteristics of a solid content of 1.0-10.0%, a particle size D50 of 0.7 μm or less, a pH of 8.0-10.0, a Zeta potential of −10 mV or less, and a viscosity of 5.0-8.0 mpa·s.

Preferably, the non-carbon non-oxygen element further comprises one or more selected from the group consisting of P, Ca, Na, Ni, Mn, K, Mg, Cr, S, and Co.

Preferably, the G peak and D peak of carbon element of the composite in the Raman spectrum has a peak height ratio of 1-20, e.g. 2, 5, 7, 8, 10, 12, 13, 16, 18 and the like.

The G peak of carbon element in the Raman spectrum reflects sp2 hybridization degree; the D peak reflects the lattice imperfection, e.g. carbon structure of sp3.

The composite having a carbon nanostructure of the present invention is a composite primarily containing carbon and comprising impurity elements, wherein carbon element primarily exists in a sp2 hybrid form.

Preferably, the G peak and D peak of carbon element of the composite in the Raman spectrum has a peak height ratio of 2-20, preferably 3-20, further preferably 5-20, especially preferably 7-20, most preferably 10-20.

The composite further has a 2D peak in the Raman spectrum.

The 2D peak represents the thickness of the lamellar structure. The higher the 2D peak intensity is, the thinner the lamella thereof is.

Preferably, the non-carbon non-oxygen element further comprises P, Ca, and Na.

Preferably, the non-carbon non-oxygen element further comprises any one selected from the group consisting of Ni, Mn, K, Mg, Cr, S and Co, or a combination of at least two selected therefrom.

In the composite having a carbon nanostructure of the present invention, other elements than carbon and oxygen elements may be selected from the group consisting of a combination of P, Si, Ca, Al, Na and Fe, a combination of P, Si, Ca, Al, Na and Mn, a combination of P, Si, Ca, Al, Na and Cr, a combination of P, Si, Ca, Al, Na, Fe, Mn and K, a combination of P, Si, Ca, Al, Na, Fe and Ni, a combination of P, Si, Ca, Al, Na and Ni, a combination of P, Si, Ca, Al, Na, Fe and K, a combination of P, Si, Ca, Al, Na, Mn and Cr and the like.

Preferably, the non-carbon non-oxygen element exists in a form of simple substance and/or compound.

Preferably, the non-carbon non-oxygen element is adsorbed on the surface of or inside the carbon nanostructure in any one or more form selected from the group consisting of simple substance, oxides and carbides. Specifically, the non-carbon non-oxygen element is metal compound and/or non-metal compound.

Preferably, the composite contains carbon element in an amount of 80 wt % or more, e.g. 82 wt %, 86 wt %, 89 wt %, 91 wt %, 94 wt %, 97 wt %, 99 wt % and the like, preferably 85-97 wt %, further preferably 90-95 wt %.

Those having 80 wt % or more, preferably 90 wt % or more, of carbon element in the composite are graphitized structures. The graphitized structures have different graphitization degree, which means different crystallinity, but all are graphitized.

Preferably, the non-carbon non-oxygen element is in an amount of 1.5 wt %-5 wt % of the composite, e.g. 2 wt %, 2.5 wt %, 2.8 wt %, 3.3 wt %, 3.6 wt %, 4.3 wt %, 4.8 wt % and the like.

Preferably, the graphene has a carbon six-membered ring honeycomb lamellar structure having a thickness of 100 nm or less, preferably of 20 nm or less, further preferably is any one selected from the group consisting of carbon six-membered ring honeycomb lamellar structures having 1-10 layers, or a combination of at least two selected therefrom, preferably any one of structures having single layer, double layers, and 3-10 layers, or a combination of at least two selected therefrom.

Preferably, the carbon six-membered ring honeycomb lamellar structure in the composite microscopically shows any one conformation selected from the group consisting of warping, curling and folding, or a combination of at least two selected therefrom.

Preferably, the non-carbon non-oxygen elements P, Si, Ca, Al and Na in the composite having a carbon nanostructure are introduced through carbon sources preferably selected from biomass carbon sources, which are any one selected from the group consisting of plants and/or agricultural and forestry wastes, or a combination of at least two selected therefrom, preferably any one selected from coniferous wood, broadleaf wood, forest wood, agricultural and forestry wastes, or a combination of at least two selected therefrom.

Preferably, the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The second object of the present invention is to provide a process for preparing the composite having a carbon nanostructure.

As Process 1 of the process for preparing the composite having a carbon nanostructure of the present invention, the process comprises the following specific steps of:

(1) catalyzing a biomass carbon source under the action of a catalyst to obtain a precursor;
(2) maintaining the temperature of the precursor at 140° C.-180° C. for 1.5-2.5 hours (h) under the condition of protective gas to obtain a first intermediate;
(3) heating the first intermediate to 350° C.-450° C. under the condition of protective gas and maintaining the temperature for 3 h-4 h to obtain a second intermediate;
(4) heating the second intermediate to 1100° C.-1300° C. under the condition of protective gas and maintaining the temperature for 2 h-4 h to obtain a third intermediate;
(5) alkali washing, acid washing and water washing the third intermediate in sequence to obtain a composite;
wherein the temperatures in steps (3) and (4) are increased at a rate of 14° C./minute (min)-18° C./min.

In the Process 1, specifically:

firstly mixing a biomass carbon source with a catalyst, stirring and catalyzing, drying to obtain a precursor;

then maintaining the temperature of the precursor at 140° C.-180° C. for 1.5-2.5 h under protective atmosphere to obtain a first intermediate; in some specific examples of the present invention, the temperature is 142° C., 148° C., 155° C., 1600° C., 172° C. or 178° C., and the temperature is maintained for 1.6 h, 1.8 h, 2 h, 2.2 h or 2.4 h.

Then increasing by temperature programming to 350° C.-450° C. and maintaining the temperature for 3 h-4 h to obtain a second intermediate; in some specific examples of the present invention, the temperature is 360° C., 370° C., 380° C., 390° C., 410° C., 420° C., 430° C. or 440° C., and the temperature is maintained for 3.1 h, 3.3 h, 3.5 h, 3.8 h or 3.9 h.

Then increasing the temperature to 1100-1300° C. and maintaining the temperature for 2 h-4 h to obtain a third intermediate, i.e. a crude product; in some specific examples of the present invention, the temperature is 1130° C., 1170° C., 1210° C. or 1280° C., and the temperature is maintained for 2.2 h, 2.4 h, 2.6 h, 2.8 h, 3.0 h, 3.2 h, 3.4 h, 3.6 h or 3.8 h.

The temperature is increased by temperature programming at a rate of 14° C./min-18° C./min; in some specific examples of the present invention, the temperature is increased at a rate of 15° C./min, 16° C./min or 17° C./min.

Finally, the third intermediate (i.e. the crude product) is alkali washed, acid washed and water washed to obtain the composite.

In the present invention, the biomass carbon source and the catalyst have a mass ratio of 1:(0.5-5), preferably 1:(1-3); in some specific examples of the present invention, the ratio is 1:0.5, 1:1 or 1:3.

In the present invention, the catalyst is any one selected from the group consisting of halogen compounds of manganese, iron-containing compound, cobalt-containing compound, and nickel-containing compound, or a combination of at least two selected therefrom.

Preferably, the iron-containing compound is any one selected from the group consisting of halogen compounds of iron, iron cyanides and iron-containing salts of acid, or a combination of at least two selected therefrom. The iron-containing salts of acid are organic acid salts containing iron element or inorganic acid salts containing iron element. The halogen compounds of iron may be ferric chloride and/or ferric bromide.

Preferably, the cobalt-containing compound is any one selected from the group consisting of halogen compounds of cobalt and cobalt-containing salts of acid, or a combination of at least two selected therefrom. The cobalt-containing salts of acid are organic acid salts containing cobalt element or inorganic acid salts containing cobalt element. The halogen compounds of cobalt may be cobalt chloride and/or cobalt bromide.

Preferably, the nickel-containing compound is any one selected from the group consisting of nickel chlorides and nickel-containing salts of acid, or a combination of at least two selected therefrom. The nickel-containing salts of acid are organic acid salts containing nickel element or inorganic acid salts containing nickel element. The halogen compounds of nickel may be nickel chloride and/or nickel bromide.

Preferably, the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

The typical but non-limitative examples of the catalyst combination of the present invention include a combination of ferrous chloride and ferric sulfate, a combination of potassium ferricyanide, potassium trioxalatoferrate, a combination of cobalt chloride, cobalt nitrate and ferric chloride, a combination of cobalt sulfate, cobalt acetate and nickel nitrate, and a combination of ferric chloride, cobalt chloride, nickel acetate.

The stirring and catalyzing treatment is carried out at 150° C.-200° C., e.g. 160° C., 170° C., 180° C., 190° C. and the like, for 4 h or more, preferably 4 h-14 h. In some specific examples of the present invention, it lasts for 4.2 h, 7 h, 9 h, 12 h, 16 h, 19 h, and 23 h.

Preferably, the precursor contains water in an amount of 10 wt % or less. In some specific examples of the present invention, the water content is 1 wt %, 2 wt %, 3 wt %, 4 wt %, 5 wt %, 6 wt %, 7 wt %, 8 wt %, or 10 wt % and the like.

Preferably, the protective atmosphere is any one selected from the group consisting of nitrogen, helium and argon, or a combination of at least two selected therefrom, preferably nitrogen.

Preferably, the acid washing is carried out by using hydrochloric acid having a concentration of 3 wt %-6 wt %, further preferably 5 wt %; the water washing is preferably carried out by using deionized water and/or distilled water; the alkali washing is carried out by using an aqueous solution of sodium hydroxide having a concentration of 5 wt %-15 wt %, further preferably 10 wt %.

Preferably, the washing is carried out at 55-65° C., e.g. 56° C., 57° C., 58° C., 60° C., 63° C. and the like, preferably 60° C.

The biomass carbon source is cellulose and/or lignose, preferably cellulose, further preferably porous cellulose.

The porous cellulose of the present invention can be obtained according to the prior art. The typical but non-limitative prior art for obtaining porous cellulose includes, e.g. preparing porous cellulose according to the method disclosed in CN104016341A, and preparing cellulose according to the method disclosed in CN103898782A.

Preferably, the porous cellulose is obtained by the following method:
  acid hydrolyzing a biomass source to obtain lignocellulose, and then porous post-processing to obtain porous cellulose; optionally, the porous cellulose is used after bleaching.

The biomass carbon source is any one selected from the group consisting of plants and/or agricultural and forestry wastes, or a combination of at least two selected therefrom, preferably any one selected from agricultural and forestry wastes, or a combination of at least two selected therefrom.

Preferably, the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The typical but non-limitative combination examples of the biomass source of the present invention include a combination of corn stalks and corn cobs, a combination of bagasse, sorghum stalks and wood chips, a combination of sorghum stalks, beet residues and xylose residues.

As Process 2 of the process for preparing the composite having a carbon nanostructure of the present invention, the process comprises the following specific steps of:
  (1) mixing a biomass carbon source with a catalyst, stirring, catalyzing and drying to obtain a precursor;
  (2) maintaining the temperature of the precursor at 280° C.-350° C., e.g. 282° C., 288° C., 295° C., 300° C., 332° C., 340° C. and the like, for 1.5-2.5 h, e.g. 1.6 h, 1.8 h, 2 h, 2.2 h, 2.4 h and the like, under protective atmosphere, then heating by temperature programming to 950-1050° C., e.g. 960° C., 970° C., 980° C., 990° C., 1010° C., 1020° C., 1030° C., 1040° C. and the like at an increasing rate of 15-20° C./min, e.g. 16° C./min, 18° C./min, 19° C./min and the like, maintaining the temperature for 3-4 h, e.g. 3.1 h, 3.3 h, 3.5 h, 3.8 h, 3.9 h and the like, to obtain a crude product;
  (3) washing the crude product to obtain a composite.

The present invention discloses choosing specific stepping temperature (15-20° C./min) of the temperature programming, the starting temperature (280-350° C.) and the temperature maintaining time, and the final maintaining temperature (950-1050° C.) and the temperature maintaining time (3-4 h). The biomass carbon source and the catalyst have a mass ratio of 1:0.1-10, e.g. 1:0.5, 1:1, 1:3, 1:5, 1:8, 1:9 and the like, preferably 1:0.5-5, further preferably 1:1-3.

Preferably, the catalyst is any one selected form the group consisting of halogen compounds of manganese, iron-containing compounds, cobalt-containing compounds, and nickel-containing compounds, or a combination of at least two selected therefrom.

Preferably, the iron-containing compound is any one selected from the group consisting of halogen compounds of iron, iron cyanides and iron-containing salts of acid, or a combination of at least two selected therefrom. The iron-containing salts of acid are organic acid salts containing iron element or inorganic acid salts containing iron element. The halogen compounds of iron may be ferric chloride and/or ferric bromide and the like.

Preferably, the cobalt-containing compound is any one selected from the group consisting of halogen compounds of cobalt and cobalt-containing salts of acid, or a combination of at least two selected therefrom. The cobalt-containing salts of acid are organic acid salts containing cobalt element or inorganic acid salts containing cobalt element. The halogen compounds of cobalt may be cobalt chloride and/or cobalt bromide and the like.

Preferably, the nickel-containing compound is any one selected from the group consisting of nickel chlorides of and nickel-containing salts of acid, or a combination of at least two selected therefrom. The nickel-containing salts of acid are organic acid salts containing nickel element or inorganic acid salts containing nickel element. The halogen compounds of nickel may be nickel chloride and/or nickel bromide and the like.

Preferably, the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

The typical but non-limitative examples of the catalyst combination of the present invention include a combination of ferrous chloride and ferric sulfate, a combination of potassium ferrocyanide, potassium trioxalatoferrate, a combination of cobalt chloride, cobalt nitrate and ferric chloride, a combination of cobalt sulfate, cobalt acetate and nickel nitrate, and a combination of ferric chloride, cobalt chloride, nickel acetate.

The stirring and catalyzing treatment is carried out at 150° C.-200° C., e.g. 160° C., 170° C., 180° C., 190° C. and the like, for 4 h or more, e.g. 4.2 h, 7 h, 9 h, 12 h, 16 h, 19 h, 23 h and the like, preferably 4 h-14 h.

Preferably, the precursor contains water in an amount of 10 wt % or less, e.g. 1 wt %, 2 wt %, 3 wt %, 4 wt %, 5 wt %, 6 wt %, 7 wt %, 8 wt %, or 1 wt %.

Preferably, the precursor is increased to a temperature of 280-350° C. at a temperature rising rate of 3-5° C./min, e.g. 3.5° C./min, 3.8° C./min, 4.2° C./min, 4.5° C./min, 4.8° C./min and the like.

Preferably, the protective atmosphere is any one selected from the group consisting of nitrogen, helium and argon, or a combination of at least two selected therefrom, preferably nitrogen.

Preferably, the crude product is acid washed and water washed in sequence. The acid washing is preferably carried out by using hydrochloric acid having a concentration of 3-6 wt %, further preferably 5 wt %; the water washing is preferably carried out by using deionized water and/or distilled water.

Preferably, the washing is carried out at 55-65° C., e.g. 56° C., 57° C., 58° C., 60° C., 63° C. and the like, preferably 60° C.

The biomass carbon source is cellulose and/or lignose, preferably cellulose, further preferably porous cellulose.

The porous cellulose of the present invention can be obtained according to the prior art. The typical but non-limitative prior art for obtaining porous cellulose includes, e.g. preparing porous cellulose according to the method disclosed in CN104016341A, and preparing cellulose according to the method disclosed in CN103898782A.

Preferably, the porous cellulose is obtained by the following method:
    acid hydrolyzing a biomass source to obtain lignocellulose, and then porous post-processing to obtain porous cellulose; optionally, the porous cellulose is used after bleaching.

The biomass carbon source is any one selected from the group consisting of plants and/or agricultural and forestry wastes, or a combination of at least two selected therefrom, preferably any one selected from agricultural and forestry wastes, or a combination of at least two selected therefrom.

Preferably, the agricultural and forestry wastes are selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The typical but non-limitative combination examples of the biomass source of the present invention include a combination of corn stalks and corn cobs, a combination of bagasse, sorghum stalks and wood chips, a combination of sorghum stalks, beet residues and xylose residues.

The process for preparing the composite of the present invention comprises the following steps:
    (1') acid hydrolyzing corn cobs to obtain lignocellulose, and then porous post-processing to obtain porous cellulose, wherein the porous cellulose is bleached for standby;
    (1) mixing the porous cellulose in step (1') with a catalyst in a mass ratio of 1:0.5-1.5, stirring at 150-200° C., catalyzing for 4 h or more, and drying to a water content of less than 10 wt % to obtain a precursor;
    (2) heating the precursor to 280-350° C. at a rate of 3-5° C./min under protective atmosphere, then heating by temperature programming to 950-1200° C. at an increasing rate of 15-20° C./min, maintaining the temperature for 3-4 h to obtain a crude product;
    (3) acid washing the crude product at 55-65° C. with hydrochloric acid having a concentration of 5 wt %, water washing to obtain a composite.

The composite of the present invention can also be prepared by the following many methods.

As the process for preparing the composite having a carbon nanostructure of the present invention, the following exemplary processes can be provided.

Process 3

The biomass source is used to obtain active carbon via current processes. Since the types and contents of microelements within different plants are greatly different, later steps such as acid washing and water washing are used to control the amount of the non-carbon non-oxygen elements. Graphene is introduced on such a basis to make the amount of the non-carbon non-oxygen element be 0.5 wt %-6 wt % of the composite.

Process 4

Commercially available lignose is high-temperature carbonized under inert gas, or graphitization reaction was not thoroughly carried out. Then graphene is added. A combination of any three or more selected from nano-P, Si, Ca, Al, Na, Fe, Ni, Mn, K, Mg, Cr, S or Co is introduced later, and the content thereof is controlled to be 0.5 wt %-6 wt %.

Process 5

Some organic wastes such as phenolic resin cystosepiment are carbonized. Then graphene is added. A combination of any three or more selected from nano-P, Si, Ca, Al, Na, Fe, Ni, Mn, K, Mg, Cr, S or Co is introduced later, and the content thereof is controlled to be 0.5 wt %-6 wt %.

Process 6

Active carbon and graphene are added to nano-graphite. A combination of any three or more selected from nano-P, Si, Ca, Al, Na, Fe, Ni, Mn, K, Mg, Cr, S or Co is introduced later, and the content thereof is controlled to be 0.5 wt %-6 wt %.

The composite having a carbon nanostructure of the present invention is not limited by the preparation processes listed above.

The products of the composite having a carbon nanostructure of the present invention are obtained by the aforesaid processes. The far-infrared and antibacterial performances of those obtained by Processes 1-2 are superior to those obtained by Processes 3-6. However, homogeneous dispersion can be made without any activation or modification when preparing down-stream products, which plays a certain effect.

The third object of the present invention is to provide a macromolecular material, comprising the above composite, or the composite prepared according to the aforesaid preparation processes.

The present invention further provides a process for preparing the macromolecular material, comprising: compounding the composite, or the composite obtained by the aforesaid processes with a macromolecular raw material, without any activation or modification of the composite,
   wherein the macromolecular raw material is any one or more selected from the group consisting of rubber, plastic, fiber, coating, adhesive agent and polymer-based composite materials.

The present invention further provides a use of the macromolecular material above in the fields selected from the group consisting of knitting, bedding, home furnishing, automotive products, furniture, pipe, profiles and clothings.

As compared to the prior art, the present invention provides a composite having a carbon nanostructure, wherein the composite comprises graphene, amorphous carbon and a non-carbon non-oxygen element; the non-carbon non-oxygen element is in an amount of 0.5 wt %-6 wt % of the composite. The present invention achieves excellent far-infrared effect and antibacterial and bacteriostatic effects by controlling the non-carbon non-oxygen content in the composite. The composite having a carbon nanostructure has a far-infrared detection normal emissivity of 0.85 or more, and an antibacterial rate of 95% or more. Meanwhile, when the composite having a carbon nanostructure of the present invention is applied in macromolecular material to modify the macromolecular material under the circumstance of a lower addition amount, notable far-infrared, antibacterial and bacteriostatic performances can be brought without any pre-modification and activation treatment. This overcomes not only the technical bias in the prior art that graphene needs to be purified, and the higher the purity is, the better the effect is, but also the technical difficulties that graphene needs to be pre-treated, e.g. activation, modification and the like, when graphene is introduced to macromolecular materials.

DETAILED DESCRIPTION

Figure 1:
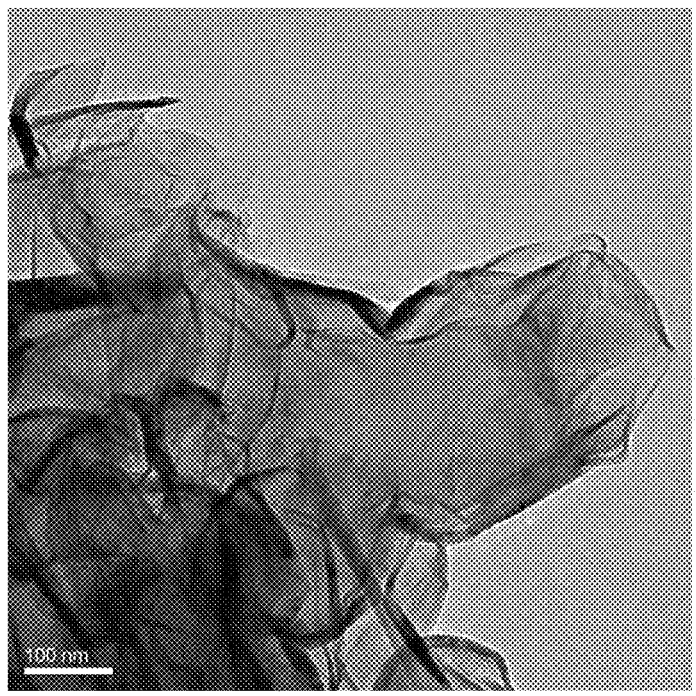
FIG. 1 shows a transmission electron microscope figure of the composite having a carbon nanostructure prepared in Example 1 of the present invention.

In order to better understand the present application, the present invention lists the following examples. Those skilled in the art should know that the examples are just used for understanding the present invention, and shall not be deemed as specific limits to the present invention.

The present invention provides a composite having a carbon nanostructure, wherein the composite comprises graphene, amorphous carbon and a non-carbon non-oxygen element,
   wherein the non-carbon non-oxygen element comprises elements of Fe Si, and Al, and is in an amount of 0.5 wt %-6 wt % of the composite.

The present invention achieves excellent far-infrared effect and antibacterial and bacteriostatic effects by controlling the non-carbon non-oxygen content in the composite. The composite having a carbon nanostructure has a far-infrared detection normal emissivity of 0.85 or more, and an antibacterial rate of 95% or more. Meanwhile, when the composite having a carbon nanostructure of the present invention is applied in macromolecular material to modify the macromolecular material under the circumstance of a lower addition amount, notable far-infrared, antibacterial and bacteriostatic performances can be brought without any pre-modification and activation treatment. This overcomes not only the technical bias in the prior art that graphene needs to be purified, and the higher the purity is, the better the effect is, but also the technical difficulties that graphene needs to be pre-treated, e.g. activation, modification and the like, when graphene is introduced to macromolecular materials.

The present invention provides a composite having a carbon nanostructure, wherein the composite comprises graphene, amorphous carbon and a non-carbon non-oxygen element,
   wherein the non-carbon non-oxygen element is in an amount of 0.5 wt %-6 wt % of the composite, preferably 1.5 wt %-5 wt %, more preferably 2 wt %-5 wt %, further preferably 2.3 wt %-4.5 wt %. In some specific examples of the present invention, the non-carbon non-oxygen element is in an amount of 0.7 wt %, 1.1 wt %, 1.3 wt %, 1.6 wt %, 2 wt %, 2.8 wt %, 3.5 wt %, 4.2 wt %, 5.3 wt % or 5.8 wt %.

The non-carbon non-oxygen element in the composite comprises elements of Fe, Si, and Al, preferably further comprises any one or more selected from the group consisting of P, Ca, Na, Ni, Mn, K, Mg, Cr, S or Co. The non-carbon non-oxygen element exists in any one form of simple substance and compounds, or a combination of at least two selected therefrom. The typical but non-limitative compounds comprise carbides, oxides and the like.

Besides carbon and oxygen elements, other elements contained in the composite having a carbon nanostructure of the present invention may be a combination of P, Si, Fe, Al and Ca, a combination of Si, Fe, Ca and A, a combination of P, Si, Fe, Al, Ca, Na and Cr, a combination of Si, Ca, Al, Na, Fe, Mn and K, a combination of P, Si, Al, Na, Fe and Ni, a combination of Ca, Si, Fe, Al, Na and Ni, a combination of P, Si, Al, Na, Fe and K, a combination of Si, Fe, Ca, Al, Mn and Cr, and the like.

The composite having a carbon nanostructure prepared according to the present invention contains many ingredients which are closely linked and play a synergistic role in mutual cooperation. Thus the content of the non-carbon non-oxygen element plays a very important role for the composite.

The composite comprises carbon element in an amount of 80 wt % or more, preferably 85 wt %-97 wt %, further preferably 90 wt %-95 wt %. In some specific examples of the present invention, the carbon content is 82 wt %, 86 wt %, 89 wt %, 91 wt %, 94 wt %, 97 wt % or 99 wt %.

In the present invention, the contents of the non-carbon non-oxygen element and carbon element can be determined by elemental analysis.

The composite having a carbon nanostructure has a far-infrared detection normal emissivity of 0.80 or more, preferably 0.85 or more, more preferably 0.88 or more. In some specific examples of the present invention, the far-infrared detection normal emissivity is 0.81, 0.83, 0.84, 0.86, 0.87, 0.88, 0.89, 0.91, 0.92, or 0.93.

The G peak and D peak of carbon element of the composite in the Raman spectrum has a peak height ratio of greater than 1, preferably 1-20, more preferably 2-20, even more preferably 3-20, further preferably 5-20, especially preferably 7-20, most preferably 10-20. In some specific examples of the present invention, the ratio is 2, 5, 7, 8, 10, 12, 13, 16, or 18.

The G peak of carbon element in the Raman spectrum reflects the degree of sp2 hybridization; the D peak reflects the lattice imperfection, e.g. carbon structure of sp3.

The composite having a specific carbon nanostructure of the present invention is a carbon-based composite having impurity elements, wherein carbon element primarily exists in a sp2 hydride form.

In the present invention, the graphene is in an amount of 10% or more of the total carbon content, preferably 10-80%.

The graphene has a carbon six-membered ring honeycomb lamellar structure having a thickness of 100 nm or less, preferably of 20 nm or less, further preferably is any one selected from the group consisting of carbon six-membered ring honeycomb lamellar structures having 1-10 layers, or a combination of at least two selected therefrom, preferably any one of structures having single layer, double layers, and 3-10 layers, or a combination of at least two selected therefrom.

Preferably, the carbon six-membered ring honeycomb lamellar structure in the composite microscopically shows any one conformation selected from the group consisting of warping, curling and folding, or a combination of at least two selected therefrom.

The microstructure of the lamellar structure in the composite typically can be observed via electron microscope which may be transmission electron microscope or scanning electron microscope.

Carbon six-membered ring honeycomb lamellar structures having more than 10 layers and a thickness of 100 nm or less are called graphene nanosheets; carbon six-membered ring honeycomb lamellar structures having more than 10 layers and a thickness of 100 nm or less and prepared by using biomass as carbon source are called biomass graphene nanosheets; carbon six-membered ring honeycomb lamellar structures having 1-10 layers are called graphene; carbon six-membered ring honeycomb lamellar structures having 1-10 layers and prepared by using biomass as carbon source is called biomass graphene. The carbon-containing substances having the aforesaid structures are called graphene-containing structures, see FIG. 1-3 for details.

Alternatively,

Graphene having a single layer: carbon atom single layer having a honeycomb structure formed by combining one carbon atom with three surrounding adjacent carbon atoms;

Graphene having few layers: two-dimension carbon material formed by stacking 3-10 layers of carbon single layers hybridized by sp2.

Graphene nanosheet: two-dimension carbon nanomaterial comprising single layer or few layers of graphene, having less than 10 layers, and a lateral dimension of greater than 100 nm.

Biomass graphene: complex carbon material prepared from biomass as raw material, containing graphene having a single layer, graphene having few layers, graphene nanosheet structure and supported with metal/non-metal compounds.

The non-carbon non-oxygen element is adsorbed on the surface of or inside the carbon nanostructure in any one form selected from the group consisting of simple substance, oxides and carbides, or a combination of at least two selected therefrom.

Preferably, the non-carbon non-oxygen element in the composite having a carbon nanostructure is introduced through carbon sources preferably selected from biomass carbon sources, which are any one selected from the group consisting of plants and/or agricultural and forestry wastes, or a combination of at least two selected therefrom, preferably any one selected from coniferous wood, broadleaf wood, forest wood, agricultural and forestry wastes, or a combination of at least two selected therefrom.

Preferably, the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The biomass carbon source is cellulose and/or lignose, preferably cellulose, further preferably porous cellulose.

The present invention does not specially define the source of the porous cellulose, which may be porous cellulose well known in the art. Preferably, the porous cellulose is obtained by the following method:

acid hydrolyzing a biomass source to obtain lignocellulose, and then porous post-processing to obtain porous cellulose; optionally, the porous cellulose is used after bleaching.

Preferably, the biomass carbon source is any one selected from the group consisting of plants and/or agricultural and forestry wastes, or a combination of at least two selected therefrom, preferably any one selected from agricultural and forestry wastes, or a combination of at least two selected therefrom.

Preferably, the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

In the present invention, the amorphous carbon is two-dimensional graphite layers or three-dimensional graphite crystallites on the edge of which there are a large number of irregular bonds. Besides a large number of sp2 carbons, there are many sp3 carbons. In fact, their interior structures are crystals having the same structure as graphite, rather than real amorphous solid, except that the layered structure formed by hexagonal annular plane of carbon atoms is messy and irregular. There are defects in the formation of the crystal; the majority of amorphous carbon is formed by molecular debris having graphite layer structures which are roughly parallel to each other, and irregularly stacked together, referred to as chaotic layer structure. The layers or debris are connected by carbon atom bonds in a form of tetrahedral bonding of diamond structure.

The composite prepared by the present invention may be determined as follows.

1. Determination of the Non-Carbon Non-Oxygen Element Content

First Method for Determining the Non-Carbon Non-Oxygen Element Content:

Decomposing the composite having a carbon nanostructure with nitric acid ($\rho=1.42$ g/mL), perchloric acid ($\rho=1.67$ g/mL) and hydrofluoric acid ($\rho=1.16$ g/mL), maintaining the temperature in nitric acid medium; determining the volume and quantitatively determining the content of P, Si, Ca, Al, Na and the like in the composite having a carbon nanostructure by standard curve method with inductively coupled plasma atomic emission spectrometer.

Second Method for Determining the Non-Carbon Non-Oxygen Element Content:

Using the National Standard GB/T17359-1998: General specification of X-ray EDS quantitative analysis for EPMA and SEM.

The present invention does not define the method for determining the non-carbon non-oxygen element content, and any known or new determining method in the prior art can be applied in the present invention. The present invention provides two methods for determining the non-carbon non-oxygen element content, preferably "first method for determining the non-carbon non-oxygen element content". In the examples of the present invention, the "first method for determining the non-carbon non-oxygen element content" was used for determination.

Infrared detection data were based on GBT 7286.1-1987 Test method for total normal emittance of metals and non-metallic materials.

Antibacterial test data were based on the test method according to GB/T 20944.3-2008, taking *Staphylococcus aureus* as examples.

2. Determination of Conductivity

The sample was placed in a sample hole of a powder resistivity meter and pressed into a sheet using a pressure of 180 kg. The height coefficient of the sample was then set by a four-probe tester to calculate the conductivity of the sample.

3. Determination of Specific Surface Area: According to GB/T 7702.20.

4. Determination of Raman Spectrum

With an excitation wavelength of 532 nm or 655 nm, the D peak, the G peak and the 2D peak of a graphene sample could be detected by attaching the sample to a $SiO_2$/Si substrate via Raman imaging. The thickness of the graphene layer and the degree of sp2 hybridization can be determined by the peak shape.

5. Determination of C/O 0.1 g of a powder sample was taken, and placed on a slide for XPS analysis to determine C/O.

The present invention further provides a macromolecular material, comprising the composite, or the composite prepared by the aforesaid process.

The macromolecular material is any one or more selected from the group consisting of rubber, plastic, fiber, coating, adhesive agent and polymer-based composite materials.

In some specific examples of the present invention, the macromolecular material is selected from the group consisting of polyester, polyurethane and viscose fiber.

The present invention further provides a process for preparing the macromolecular material, comprising: compounding the composite, or the composite obtained by the aforesaid processes with a macromolecular raw material, without any activation or modification of the composite, wherein the macromolecular raw material is any one or more selected from the group consisting of rubber, plastic, fiber, coating, adhesive agent and polymer-based composite materials.

The present invention further provides a use of the macromolecular material above in the fields selected from the group consisting of knitting, bedding, home furnishing, automotive products, furniture, pipe, profiles and clothings.

Specifically, the above-mentioned macromolecular material is used to make an article, which includes fabric, film, pillow, mattress, cushion, back cushion, sofa, waist support, insoles, bra, car seat, toilet seat, hand warmer, pipe, furniture, profiles and the like. All of the above-mentioned articles could be prepared by the prior art process.

The composite having a carbon nanostructure of the present invention can be well compounded with macromolecular materials and can be well dispersed in macromolecular materials without any modification or activation of the composite, and can play its due roles, such as far-infrared performance and antibacterial property.

In order to further illustrate the present invention, the composite, process for preparing the same and a macromolecular material and process for preparing the same provided in the present invention are detailedly disclosed in combination with the examples.

PREPARATION EXAMPLE 1

The preparation of porous cellulose may be referred to the patent document CN104016341A, specifically comprising: adjusting an aqueous solution of corn cobs to pH=3 with sulfuric acid at 90° C., immersing for 10 minutes for hydrolysis to obtain lignocellulose, wherein the sulfuric acid was in an amount of 3% of the corn cob mass; and then soaking the obtained lignocellulose in acidic sulphite at 70° C. for 1 h to obtain porous cellulose for backup, wherein the acid is sulfuric acid; the sulphite is magnesium sulfite; the sulfuric acid is in an amount of 4% of the lignocellulose mass; the liquid to solid ratio is 2:1.

PREPARATION EXAMPLE 2

The process for preparing conventional cellulose may refer to the patent document CN103898782A, specifically:
(1) pulverization pre-treating wheat straw, digesting the treated wheat straw with an organic acid solution of formic acid and acetic acid having a total acid concentration of 80 wt %, wherein the mass ratio of acetic acid to formic acid in the organic acid solution of this example was 1:12, and adding hydrogen peroxide ($H_2O_2$) in an amount of 1 wt % of the wheat straw material as a catalyst previously, controlling the reaction temperature to 120° C. for 30 min, wherein the ratio of solid to liquid was 1:10, and the obtained reaction liquid was subjected to a first solid-liquid separation;
(2) adding the solid obtained from the first solid-liquid separation into an organic acid solution of formic acid and acetic acid having a total acid concentration of 75 wt % for acid washing, wherein the organic acid solution having a total acid concentration of 75 wt % was added with hydrogen peroxide ($H_2O_2$) in an amount of 8 wt % of the wheat straw material as a catalyst; and acetic acid and formic acid had a mass ratio of 1:12, controlling the temperature to 90° C., washing for 1 h, wherein the mass ratio of solid to liquid was 1:9, subjecting the reaction liquid to a second solid-liquid separation;
(3) collecting the liquid obtained in the first and second solid-liquid separations, subjecting to high-temperature and high-pressure evaporation at 120° C. and 301 kPa until dryness, condensing and refluxing the resultant formic acid and acetic acid vapor to the reaction vessel of step (1) as the digestion liquid for the digestion of step (1);
(4) collecting the solid obtained by the second solid-liquid separation, water washing, controlling the washing temperature to 80° C. and the concentration of water-washing pulp to 6 wt %, and subjecting the obtained water-washing pulp to a third solid-liquid separation;
(5) collecting the liquid obtained in the third solid-liquid separation, subjecting to water and acid distillation, and returning the resultant mixed acid liquid to the reaction vessel of the step (1) as the digestion liquid for the digestion in the step (1), and returning the resultant water to step (5) as the water for water washing in step (5);
(6) collecting and screening the solid obtained from the third solid-liquid separation to obtain desired fine pulp cellulose.

PREPARATION EXAMPLE 3

Preparations of lignose and cellulose of poplar, lignose and cellulose of *eucalyptus* can be referred to "a comprehensive utilization process of lignocellulosic biomass" disclosed in CN103131018A, specifically:
(1) pulverization pre-treating poplar or *eucalyptus* foliage, acid-hydrolyzing the treated lignocellulosic biomass using an organic acid solution containing formic acid having a concentration of 90% and acetic acid having a concentration of 5% and 5% of water, controlling the reaction temperature to 165° C. for 10 minutes, wherein the liquid-solid mass ratio of the mixed acid liquid of formic acid and acetic acid to the biomass material was 1:20, and subjecting the obtained reaction liquid to a first solid-liquid separation;
(2) adding the solid obtained in step (1) to an organic acid solution of formic acid having a concentration of 90% and acetic acid having a concentration of 5% and 5% of water for acid washing at 60-80° C. for 0.5-1 h, subjecting the reaction liquid to a second solid-liquid separation, water washing the solid obtained by separation to obtain required cellulose;
(3) collecting the liquid obtained from the solid-liquid separations in steps (1) and (2) for concentrating by distillation under reduced pressure to obtain formic acid and acetic acid vapor and a concentrated liquid having a concentration which is 4 or 5 times of the initial concentration;
(4) condensing and refluxing the formic acid and acetic acid vapor distilled in step (3) to the reaction kettle in step (1) for acid hydrolysis in step (1);
(5) adding water to dilute the concentrated liquid in step (3), wherein the auxiliaries and concentrated liquid had a mass ratio of 2:1, controlling to 60-70° C. and stirring for 0.5-1 h, subjecting to a third solid-liquid separation, adding water to the resultant solid (water and the solid having a mass ratio of 3:1), stirring at 75-80° C. for 2-3 h, water washing and de-esterifying to obtain the lignose as required.

EXAMPLE 1

A composite having a carbon nanostructure was obtained by the following method:
(1) mixing the cellulose obtained according to Preparation Example 2 and ferrous chloride in a mass ratio of 1:0.1, stirring at 150° C. and catalyzing for 4 h, drying to a water content of 10 wt %, to obtain a precursor;
(2) increasing the temperature of the precursor to 280° C. at a rate of 3° C./min under protective atmosphere, and maintaining for 2 h, then heating by temperature programming to 950° C. at an increasing rate of 15° C./min, maintaining for 3 h to obtain a crude product;
(3) washing the crude product with hydrochloric acid having a concentration of 4 wt % at 55-65° C. and water washing to obtain a composite having a carbon nanostructure.

The composite having a carbon nanostructure prepared in Example 1 was determined with Raman spectrum, and the results showed that the G peak and D peak had a peak height ratio of 1.1.

It was determined by the "first method for determining the non-carbon non-oxygen element content" that the composite having a carbon nanostructure primarily comprised elements of P, Si, Ca, Al, Na, Fe, and Mg.

EXAMPLE 2

A composite having a carbon nanostructure was obtained by the following method:
(1) mixing the cellulose obtained according to Preparation Example 2 and ferric chloride in a mass ratio of 1:1, stirring at 200° C. and catalyzing for 8 h, drying to a water content of 8 wt %, to obtain a precursor;
(2) increasing the temperature of the precursor to 350° C. at a rate of 5° C./min under protective atmosphere, maintaining for 2 h, then heating by temperature programming to 1050° C. at an increasing rate of 20° C./min, maintaining for 4 h to obtain a crude product;
(3) washing the crude product with hydrochloric acid having a concentration of 6 wt % at 55-65° C. and water washing to obtain a composite having a carbon nanostructure.

The composite having a carbon nanostructure prepared in Example 2 was determined with Raman spectrum, and the results showed that the G peak and D peak had a peak height ratio of 4.8.

It was determined by the "first method for determining the non-carbon non-oxygen element content" that the composite having a carbon nanostructure primarily comprised elements of P, Si, Ca, Al, Na, Fe, Mg and S.

EXAMPLE 3

A composite having a carbon nanostructure was obtained by the following method:

(1) mixing the poplar cellulose obtained according to Preparation Example 3 and ferric chloride in a mass ratio of 1:1, stirring at 200° C. and catalyzing for 8 h, drying to a water content of 8 wt %, to obtain a precursor;
(2) increasing the temperature of the precursor to 350° C. at a rate of 5° C./min under protective atmosphere, maintaining for 2 h, then heating by temperature programming to 1050° C. at an increasing rate of 20° C./min, maintaining for 4 h to obtain a crude product;
(3) washing the crude product with hydrochloric acid having a concentration of 6 wt % at 55-65° C. and water washing to obtain a composite having a carbon nanostructure.

The composite having a carbon nanostructure prepared in Example 3 was determined with Raman spectrum, and the results showed that the G peak and D peak had a peak height ratio of 4.6.

It was determined by the "first method for determining the non-carbon non-oxygen element content" that the composite having a carbon nanostructure primarily comprised elements of P, Si, Ca, Al, Na, Fe and Ni.

EXAMPLE 4

A composite having a carbon nanostructure was obtained by the following method:
(1) mixing the porous cellulose obtained according to Preparation Example 1 and ferric chloride in a mass ratio of 1:1, stirring at 200° C. and catalyzing for 8 h, drying to a water content of 4 wt %, to obtain a precursor;
(2) increasing the temperature of the precursor to 350° C. at a rate of 5° C./min under protective atmosphere, maintaining for 2 h, then heating by temperature programming to 1000° C. at an increasing rate of 20° C./min, maintaining for 4 h to obtain a crude product;
(3) washing the crude product with hydrochloric acid having a concentration of 4 wt % at 55-65° C. and water washing to obtain a composite having a carbon nanostructure.

The composite having a carbon nanostructure prepared in Example 4 was determined with Raman spectrum, and the results showed that the G peak and D peak had a peak height ratio of 6.8.

It was determined by the "first method for determining the non-carbon non-oxygen element content" that the composite having a carbon nanostructure primarily comprised elements of P, Si, Ca, Al, Na, Fe, Mg, Fe, Mg and K.

EXAMPLE 5

A composite having a carbon nanostructure was obtained by the following method:
(1) mixing the *eucalyptus* cellulose obtained according to Preparation Example 3 and nickel chloride in a mass ratio of 1:0.5, stirring at 170° C. and catalyzing for 5 h, drying to a water content of 6 wt %, to obtain a precursor;
(2) increasing the temperature of the precursor to 300° C. at a rate of 4° C./min under protective atmosphere, maintaining for 3 h, then heating by temperature programming to 1000° C. at an increasing rate of 17° C./min, maintaining for 4 h to obtain a crude product;
(3) washing the crude product with hydrochloric acid having a concentration of 5 wt % at 60° C. and water washing to obtain a composite having a carbon nanostructure.

The composite having a carbon nanostructure prepared in Example 5 was determined with Raman spectrum, and the results showed that the G peak and D peak had a peak height ratio of 2.1.

It was determined by the "first method for determining the non-carbon non-oxygen element content" that the composite having a carbon nanostructure primarily comprised elements of P, Si, Ca, Al, Na, Fe, Mg, Ni and K.

EXAMPLE 6

A composite having a carbon nanostructure was obtained by the following method:
(1) mixing the poplar cellulose obtained according to Preparation Example 3 and ferrous chloride in a mass ratio of 1:3, stirring at 180° C. and catalyzing for 5 h, drying to a water content of 6 wt %, to obtain a precursor;
(2) increasing the temperature of the precursor to 300° C. at a rate of 4° C./min under protective atmosphere, maintaining for 3 h, then heating by temperature programming to 1000° C. at an increasing rate of 17° C./min, maintaining for 4 h to obtain a crude product;
(3) washing the crude product with hydrochloric acid having a concentration of 5 wt % at 60° C. and water washing to obtain a composite having a carbon nanostructure.

The composite having a carbon nanostructure prepared in Example 6 was determined with Raman spectrum, and the results showed that the G peak and D peak had a peak height ratio of 13.2.

It was determined by the "first method for determining the non-carbon non-oxygen element content" that the composite having a carbon nanostructure primarily comprised elements of P, Si, Ca, Al, Na, Fe, K and Mg.

EXAMPLE 7

A composite having a carbon nanostructure was obtained by the following method:
(1) mixing the porous cellulose obtained according to Preparation Example 1 and manganese chloride in a mass ratio of 1:5, stirring at 180° C. and catalyzing for 5 h, drying to a water content of 6 wt %, to obtain a precursor;
(2) increasing the temperature of the precursor to 300° C. at a rate of 4° C./min under protective atmosphere, maintaining for 3 h, then heating by temperature programming to 1000° C. at an increasing rate of 17° C./min, maintaining for 4 h to obtain a crude product;
(3) washing the crude product with hydrochloric acid having a concentration of 5 wt % at 60° C. and water washing to obtain a composite having a carbon nanostructure.

The composite having a carbon nanostructure prepared in Example 7 was determined with Raman spectrum, and the results showed that the G peak and D peak had a peak height ratio of 15.

It was determined by the "first method for determining the non-carbon non-oxygen element content" that the composite having a carbon nanostructure primarily comprised elements of P, Si, Ca, Al, Na, Fe, Mg, Mn and S.

EXAMPLE 8

It was different from Example 6 in replacing poplar cellulose with lignose. The composite having a carbon nanostructure prepared in Example 8 was determined with Raman spectrum, and the results showed that the G peak and D peak had a peak height ratio of 10.8.

It was determined by the "first method for determining the non-carbon non-oxygen element content" that the composite having a carbon nanostructure primarily comprised elements of P, Si, Ca, Al, Na, Fe, K, Mg and Co.

EXAMPLE 9

It was different from Example 7 in washing with NaOH solution having a concentration of 10% for 4 h before acid washing. The composite having a carbon nanostructure prepared in Example 9 was determined with Raman spectrum, and the results showed that the G peak and D peak had a peak height ratio of 15.

It was determined by the "first method for determining the non-carbon non-oxygen element content" that the composite having a carbon nanostructure primarily comprised elements of P, Si, Ca, Al, Na and Cr.

EXAMPLE 10

It was different from Example 1 in that the catalyst was changed from 0.1 wt % to 8 wt %. The composite having a carbon nanostructure prepared in Example 10 was determined with Raman spectrum, and the results showed that the G peak and D peak had a peak height ratio of 16.2.

It was determined by the "first method for determining the non-carbon non-oxygen element content" that the composite having a carbon nanostructure primarily comprised elements of P, Si, Ca, Al, Na, Fe and Mg.

EXAMPLE 11

It was different from Example 1 in that the catalyst was changed from 0.1 wt % to 10 wt %. The composite having a carbon nanostructure prepared in Example 11 was determined with Raman spectrum, and the results showed that the G peak and D peak had a peak height ratio of 18.

It was determined by the "first method for determining the non-carbon non-oxygen element content" that the composite having a carbon nanostructure primarily comprised elements of P, Si, Ca, Al, Na, Fe, Mg and K.

EXAMPLE 12

It was different from Example 1 in that the catalyst was changed from 0.1 wt % to 13 wt %. The composite having a carbon nanostructure prepared in Example 12 was determined with Raman spectrum, and the results showed that the G peak and D peak had a peak height ratio of 20.

It was determined by the "first method for determining the non-carbon non-oxygen element content" that the composite having a carbon nanostructure primarily comprised elements of P, Si, Ca, Al, Na, Fe and Mg.

In the comparison examples, graphene as one of the nanomaterials is discussed as a contrast, but is not limited to other nanomaterials.

COMPARISON EXAMPLE 1

Graphene obtained in Example 7 disclosed in CN104016341A "A Process for Preparing Porous Graphene" was used as Comparison Example 1. Graphene prepared in the comparison example was determined with Ra-man spectrum, and the results showed that the G peak and D peak had a peak height ratio of 13.

It was determined by the "first method for determining the non-carbon non-oxygen element content" that the obtained porous graphene primarily comprised elements of P, Si, Ca, Al, Na, Fe, Mg and K.

COMPARISON EXAMPLE 2

A phosphorus-doped graphene was prepared according to the process disclosed in CN103508444A, specifically comprising:

adding 1 g of graphite having a purity of 95% into 24 mL of concentrated nitric acid having a mass percent of 65%, and then mixing with 90 mL concentrated sulfuric acid having a mass percent of 98%, stirring the mixture under the environment of ice water mixed bath for 20 min, adding potassium hypermanganate slowly into the mixture, wherein potassium hypermanganate and graphite had a mass ratio of 5:1, stirring for 1 h, heating the mixture to 85° C. and maintaining for 30 min, then adding deionized water, and then maintaining at 85° C. for 30 min, wherein the deionized water and graphite had a liquid-solid ratio of 90 mL:1 g, finally adding hydrogen peroxide solution having a mass percent of 30%, wherein hydrogen peroxide solution and graphite had a liquid-solid ratio of 10 mL:1 g, stirring for 10 min, pump filtering the mixture, then washing the solid with diluted hydrochloric acid and deionized water in sequence, wherein the diluted hydrochloric acid, deionized water and graphite had a liquid-solid ratio of 100 mL:150 mL:1 g, washing for three times, finally drying the solid substance in an vacuum oven at 60° C. for 12 h to obtain a graphite oxide;

homogeneously mixing 5 parts by mass of graphite oxide, 0.3 parts by mass of phosphorus pentoxide, 0.3 parts by mass of silicon dioxide powder, 0.2 parts by mass of calcium chloride, 0.1 parts by mass of magnesium chloride and 0.1 parts by mass of ferrous chloride, placing in an argon atmosphere having a flow rate of 300 mL/min, heating to 900° C. in an increasing rate of 15° C./min, maintaining for 2 h, then decreasing the temperature to room temperature in an argon atmosphere having a flow rate of 300 mL/min to obtain a phosphorus-doped graphene.

Nitrogen-doped graphene prepared in Comparison Example 2 was determined with Raman spectrum, and the results showed that the G peak and D peak had a peak height ratio of 5.

It was determined by the "first method for determining the non-carbon non-oxygen element content" that the phosphorus-doped graphene primarily comprised elements of P, Si, Ca, Fe, Mn, Mg and S.

COMPARISON EXAMPLE 3

A process for preparing graphene using graphite as raw material:

(1) adding 50 mL of concentrated nitric acid into a mixed solution of 5 g of flaky graphite and 150 mL of concentrated sulfuric acid, stirring at room temperature for 24 hours, washing with deionized water for 3 times and drying at 60° C. to obtain a graphite intercalation compound;

(2) rapidly expanding the graphite intercalation compound obtained above at 1050° C. for 30 seconds to obtain expanded graphite;

(3) slowing adding 3 g of potassium permanganate to a mixture of 0.3 g of the above-obtained expanded graphite and 60 mL of concentrated sulfuric acid, stirred at 60° C. for 24 hours, adding 60 mL of deionized water and 15 mL of hydrogen peroxide under the ice bath conditions, washing to neutral to obtain a graphene oxide;

(4) dispersing the graphene oxide obtained above in water, separating the graphene oxide by centrifugation, centrifugalizing at 8000 rpm for 40 minutes to obtain supernatant 1 and precipitate 1, wherein the supernatant 1 was small-size graphene oxide, dispersing the supernatant 1, transferring the graphene oxide by transfer printing method to polyterephthalic acid plastic (PET) substrate, reducing with HI acid at 50° C. for 60 min to obtain graphene.

Graphene prepared in Comparison Example 3 was determined with Raman spectrum, and the results showed that the G peak and D peak had a peak height ratio of 18.

It was determined by the "first method for determining the non-carbon non-oxygen element content" that the obtained graphene primarily comprised elements of Mn and S.

COMPARISON EXAMPLE 4

A composite was obtained by the following method:
(1) mixing the cellulose obtained according to Preparation Example 2 and ferric chloride in a mass ratio of 1:1, stirring at 100° C. and catalyzing for 4 h, drying to a water content of 8 wt %, to obtain a precursor;
(2) increasing the temperature of the precursor to 400° C. at a rate of 8° C./min under protective atmosphere, maintaining for 2 h, then heating by temperature programming to 800° C. at an increasing rate of 25° C./min, maintaining for 4 h to obtain a crude product;
(3) washing the crude product with hydrochloric acid having a concentration of 6 wt % at 55-65° C. and water washing to obtain a composite.

The composite prepared in Comparison Example 4 was determined with Raman spectrum, and the results showed that the G peak and D peak had a peak height ratio of 0.3.

It was determined by the "first method for determining the non-carbon non-oxygen element content" that the composite primarily comprised elements of P, Si, Ca, Al, Na, Fe and Mg.

EXAMPLE 13

A composite having a carbon nanostructure was obtained by the following method:
(1) mixing corn cob cellulose and ferrous chloride in a mass ratio of 1:1, stirring at 150° C. and catalyzing for 4 h, drying to a water content of 10 wt %, to obtain a precursor;
(2) increasing the temperature of the precursor to 170° C. at a rate of 3° C./min under $N_2$ atmosphere, maintaining for 2 h, then heating by temperature programming to 400° C. at an increasing rate of 15° C./min, maintaining for 3 h to obtain a crude product;
(3) washing the crude product with sodium hydroxide solution having a concentration of 10% and hydrochloric acid having a concentration of 4 wt % at 55-65° C. and water washing to obtain a composite having a carbon nanostructure.

The composite having a carbon nanostructure prepared in Example 13 was determined with Raman spectrum, and the results showed that the G peak and D peak had a peak height ratio of 3.

It was determined by the "first method for determining the non-carbon non-oxygen element content" that the composite having a carbon nanostructure primarily comprised elements of P, Si, Ca, Al, Fe and Mg. The specific content can be referred to Table 2 which shows the performance testing results of the examples and comparison examples of the present application.

The composite prepared thereof was tested, and the results can be referred to FIG. 1 which shows a transmission electron microscope of the composite having a carbon nanostructure prepared in Example 13 of the present invention.

EXAMPLE 14

A composite having a carbon nanostructure was obtained by the following method:
(1) mixing corn cob cellulose and ferric chloride in a mass ratio of 1:0.5, stirring at 180° C. and catalyzing for 8 h, drying to a water content of 5 wt %, to obtain a precursor;
(2) increasing the temperature of the precursor to 180° C. at a rate of 14° C./min under $N_2$ atmosphere, maintaining for 2.5 h, then heating to 450° C. at a rate of 14° C./min, maintaining for 4 h, then heating to 1300° C. at a rate of 18° C./min, maintaining for 2 h to obtain a crude product;
(3) washing the crude product with sodium hydroxide solution having a concentration of 15% and hydrochloric acid having a concentration of 6 wt % at 55-65° C. and water washing to obtain a composite having a carbon nanostructure.

The composite having a carbon nanostructure prepared in Example 14 was determined with Raman spectrum, and the results showed that the G peak and D peak had a peak height ratio of 3.5.

It was determined by the "first method for determining the non-carbon non-oxygen element content" that the composite having a carbon nanostructure primarily comprised elements of P, Si, Ca, Al, Fe and Mg. The specific content refers to Table 2 which shows the performance testing results of the examples and comparison examples of the present application.

EXAMPLE 15

A composite having a carbon nanostructure was obtained by the following method:
(1) mixing corncob cellulose and a mixture of ferric chloride and cobalt chloride (wherein ferric chloride and cobalt chloride had a mass ratio of 20:1) in a mass ratio of 1:5, stirring at 200° C. and catalyzing for 14 h, drying to a water content of 1 wt %, to obtain a precursor;
(2) decreasing the temperature of the precursor to 140° C. under argon atmosphere, maintaining for 1.5 h, then heating to 350° C. at a rate of 16° C./min, maintaining for 4 h, then heating to 1100° C. at a rate of 17° C./min, maintaining for 4 h to obtain a crude product;
(3) washing the crude product with sodium hydroxide solution having a concentration of 5% and hydrochloric acid having a concentration of 3 wt % at 55-65° C. and water washing to obtain a composite having a carbon nanostructure.

The composite having a carbon nanostructure prepared in Example 15 was determined with Raman spectrum, and the results showed that the G peak and D peak had a peak height ratio of 4.5.

It was determined by the "first method for determining the non-carbon non-oxygen element content" that the composite having a carbon nanostructure primarily comprised elements of P, Si, Ca, Al, Fe and Mg. The specific content can be referred to Table 2 which shows the performance testing results of the examples and comparison examples of the present application.

EXAMPLE 16

Corn cob cellulose in Example 13 was replaced with reed cellulose.

The composite having a carbon nanostructure prepared in Example 16 was determined with Raman spectrum, and the results showed that the G peak and D peak had a peak height ratio of 4.8.

It was determined by the "first method for determining the non-carbon non-oxygen element content" that the composite having a carbon nanostructure primarily comprised elements of Si, Ca, Al, Fe, Mg and S. The specific content can be referred to Table 2 which shows the performance testing results of the examples and comparison examples of the present application.

Figure 2:
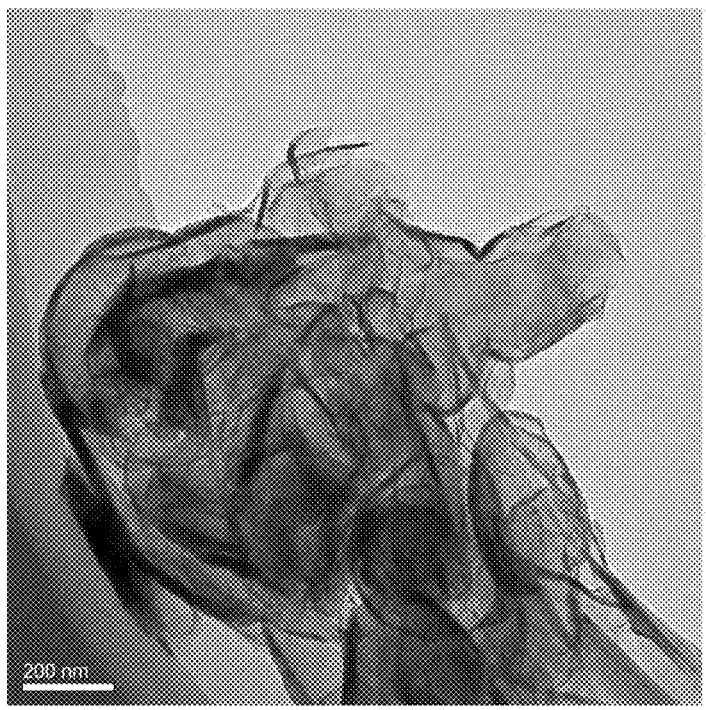
FIG. 2 shows a transmission electron microscope figure of the composite having a carbon nanostructure prepared in Example 2 of the present invention.

The composite prepared thereof was tested, and the results can be referred to FIG. 2 which shows a transmission electron microscope of the composite having a carbon nanostructure prepared in Example 16 of the present invention.

EXAMPLE 17

Corn cob cellulose in Example 13 was replaced with poplar cellulose.

The composite having a carbon nanostructure prepared in Example 17 was determined with Raman spectrum, and the results showed that the G peak and D peak had a peak height ratio of 4.6.

It was determined by the "first method for determining the non-carbon non-oxygen element content" that the composite having a carbon nanostructure primarily comprised elements of P, Si, Al, Na, Fe and Ni. The specific content can be referred to Table 2 which shows the performance testing results of the examples and comparison examples of the present application.

Figure 3:
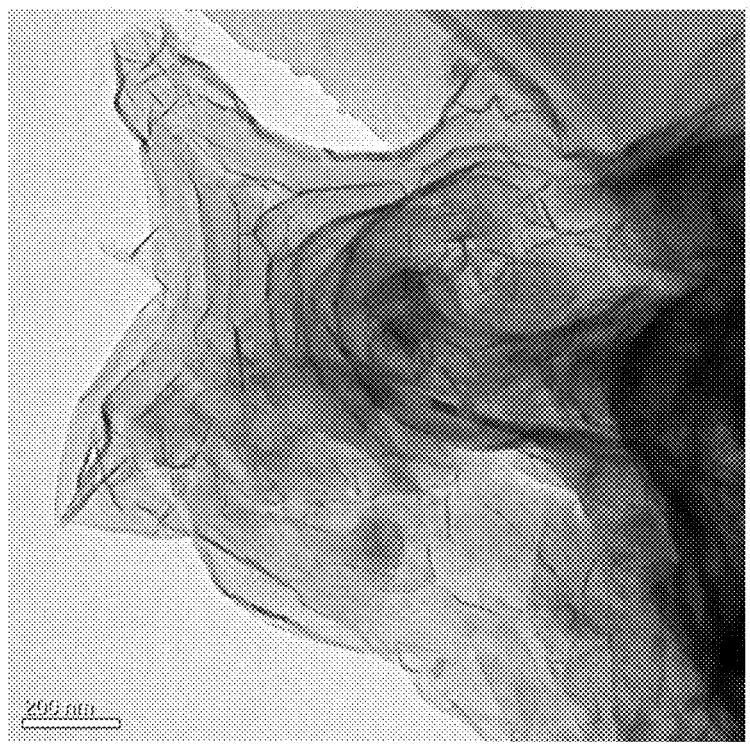
FIG. 3 shows a transmission electron microscope figure of the composite having a carbon nanostructure prepared in Example 3 of the present invention.

The composite prepared thereof was tested, and the results can be referred to FIG. 3 which shows a transmission electron microscope of the composite having a carbon nanostructure prepared in Example 17 of the present invention.

EXAMPLE 18

Corn cob cellulose in Example 13 was replaced with corn cob lignose.

The composite having a carbon nanostructure in Example 18 was determined with Raman spectrum, and the results showed that the G peak and D peak had a peak height ratio of 2.8.

It was determined by the "first method for determining the non-carbon non-oxygen element content" that the composite having a carbon nanostructure primarily comprised elements of P, Si, Ca, Al, Na, Fe, Mg, Fe, Mg and K. The specific content can be referred to Table 2 which shows the performance testing results of the examples and comparison examples of the present application.

EXAMPLE 19

Adding corn cob spare material into 44% zinc chloride solution (adjusted to pH=1 with hydrochloric acid) in a 3 times amount, thoroughly stirring and impregnating, standing and absorbing for 5 h, then thoroughly stirring, standing and absorbing for 5 h till zinc chloride solution was completely absorbed, moving into an open flat carbonization furnace for sealed carbonization at 400° C. for 3 h, thoroughly stirring every 30 minutes or so, dropping the furnace temperature to below 100° C. before stirring, heating to sealed carbonization till black coke was formed, discharging and cooling, impregnating with 44% zinc chloride solution (adjusted to pH=1 with hydrochloric acid) in a 2 times amount, fully stirring, so that zinc chloride solution was completely absorbed, moving into an activation furnace, activating at 650° C. for 70 minutes, discharging and cooling, transferring into a wooden barrel, adding 40% ammonium chloride solution in the same amount, thoroughly stirring and washing, standing and clarifying, siphoning out clear liquid, stirring and washing with 30%, 12% and 3% ammonium chloride solution in sequence, then stirring and washing with 30% hydrochloric acid in the same amount, filtering out carbon particles, moving into a pot, adding water in the same volume, boiling and washing till there was no ammonium chloride, heating and evaporating, stirring and stir-frying, discarding moisture, drying and pulverizing, filtering with a 120-mesh sieve to obtain an activate carbon.

Introducing graphene on such a basis, and introducing elements of P, Si, Ca, Al, Fe, and Mg, specifically nanomaterials of nano-phosphorus pentoxide, nano-silicon powder, nano-calcium carbonate, nano-aluminum powder, nano-iron, and nano-magnesium powder to obtain a composite having a carbon nanostructure.

It was determined by the "first method for determining the non-carbon non-oxygen element content" that the composite having a carbon nanostructure primarily comprised elements of P, Si, Ca, Al, Na, Fe, Mg, Fe, Mg and K. The specific content can be referred to Table 2 which shows the performance testing results of the examples and comparison examples of the present application.

EXAMPLE 20

Sealing and carbonizing lignose in a carbonization furnace at 400° C. for 3 h, thoroughly stirring once every 30 min, lowering the furnace temperature to below 100° C. before stirring, heating to 2200° C. under argon conditions after stirring, sealing and graphitizing for 2 h, discharging and cooling, stirring and washing with ammonium chloride solution having a concentration of 30%, 12% and 3%, stirring and washing with hydrochloric acid having a concentration of 30% in an equivalent amount, drying, pulverizing and filtering with a 120-mesh sieve to obtain a mixed carbon material of graphite and active carbon.

Introducing graphene on such a basis, and introducing elements of P, Si, Ca, Al, Fe, and Mg, specifically nanomaterials of nano-phosphorus pentoxide, nano-silicon powder, nano-calcium carbonate, nano-aluminum oxide, nano-iron, and nano-magnesium powder to obtain a composite having a carbon nanostructure.

It was determined by the "first method for determining the non-carbon non-oxygen element content" that the composite having a carbon nanostructure primarily comprised elements of P, Si, Ca, Al, Na, Fe, Mg, Fe, Mg and K. The specific content can be referred to Table 2 which shows the performance testing results of the examples and comparison examples of the present application.

EXAMPLE 21

Phenolic resin foam board was firstly carbonized to remove oxyhydrogen elements, and then high-temperature carbonized at 700° C. On such a basis, graphene was introduced; and elements of P, Si, Ca, Al, Fe and Mg were introduced, specifically nano-materials of nano-phosphorus pentoxide, nano-silicon, nano-calcium carbonate, nano-aluminum oxide, nano-iron, nano-magnesium to obtain a composite having a carbon nanostructure.

It was determined by the "first method for determining the non-carbon non-oxygen element content" that the composite having a carbon nanostructure primarily comprised elements of P, Si, Ca, Al, Na, Fe, Mg, Fe, Mg and K. The specific content can be referred to Table 2 which shows the performance testing results of the examples and comparison examples of the present application.

EXAMPLE 22

Adding active carbon and graphene into nano-graphite, introducing graphene on such a basis, and introducing elements of P, Si, Ca, Al, Fe, and Mg, specifically nano-materials of nano-phosphorus pentoxide, nano-silicon powder, nano-calcium carbonate, nano-aluminum oxide, nano-iron, nano-magnesium to obtain a composite having a carbon nanostructure.

It was determined by the "first method for determining the non-carbon non-oxygen element content" that the composite having a carbon nanostructure primarily comprised elements of P, Si, Ca, Al, Na, Fe, Mg, Fe, Mg and K. The specific content can be referred to Table 2 which shows the performance testing results of the examples and comparison examples of the present application.

COMPARISON EXAMPLE 5

Graphene was prepared according to the prior art, specifically comprising:

hydrolyzing corn cobs at 180° C. in nitric acid for 10 h to obtain lignocellulose, wherein nitric acid was in an amount of 20% of the corn cob mass; treating the lignocellulose by acid sulphite method at 180° C. for 6 h to obtain porous cellulose, wherein pH during the treatment by acid sulphite method was 7; the acid is sulfuric acid; the sulphite is sodium sulphite; the sulfuric acid was in an amount of 30% of the lignocellulose mass; the liquid-solid ratio was 20:10;

bleaching the porous cellulose at 100° C. for 5 h with hydrogen peroxide in an amount of 5% by mass of the porous cellulose;

stirring the prepared porous cellulose and ferric nitrate in a mass ratio of 2:1 at 180° C. for 10 h for catalytic treatment, drying the catalytically treated product at 120° C. to obtain a first intermediate having a water content of less than 5 wt %;

placing the first intermediate product in a carbonization furnace, introducing oxygen gas as a shielding gas into the carbonization furnace at a gas flow rate of 800 mL/min, heating the first intermediate product from 20° C. to 400° C. at a rate of 20° C./min, maintaining for 8 h to obtain a second intermediate product; heating the second intermediate product from 400° C. to 900° C. at a rate of 50° C./min, maintaining for 7 h to obtain a third intermediate product; heating the third intermediate product from 900° C. to 1300° C. at a rate of 60° C./min to obtain a fourth intermediate product; cooling the fourth intermediate product from 1300° C. to 1000° C. at a rate of 50° C./min, maintaining for 4 h, cooling the cooled fourth intermediate product to 20° C.

washing the cooled fourth intermediate product at 120° C. for 24 hours in an aqueous solution of sodium hydroxide having a mass concentration of 55% to obtain a first washed product; washing the first washed product at 150° C. for 24 hours in an aqueous solution of hydrochloric acid having a mass concentration of 10% to obtain a second washed product; washing the second washed product with steaming water to neutral, drying to obtain graphene.

The Raman spectrum determination of graphene prepared in the comparison example showed that the G peak and D peak had a peak height ratio of 13.

It was determined by the "first method for determining the non-carbon non-oxygen element content" that the obtained graphene primarily comprised elements of P, Si, Ca, Al, Na, Fe, Mg and K. The specific content can be referred to Table 1 which shows the performance testing results of the examples and comparison examples of the present application.

COMPARISON EXAMPLE 6

Graphene was prepared according to the prior art, specifically comprising:

adding 1 g of graphite having a purity of 95% into 24 mL of concentrated nitric acid having a mass percent of 65% and 90 mL of concentrated sulfuric acid having a mass percent of 98%, mixing and placing the mixture in an ice-water bath, stirring for 20 min, slowly adding potassium permanganate into the mixture in a mass ratio of potassium permanganate to graphite of 5:1, stirring for 1 hour, heating the mixture to 85° C. and maintaining for 30 min, adding deionized water and maintaining at 85° C. for 30 min, wherein deionized water and graphite had a liquid-solid ratio of 90 mL:1 g, and finally adding hydrogen peroxide solution having a mass percent of 30%, wherein the liquid-solid ratio of hydrogen peroxide solution and graphite was 10 mL:1 g, stirring for 10 min, pump filtering the mixture, washing three times in total the solid with dilute hydrochloric acid and deionized water in sequence, wherein dilute hydrochloric acid, deionized water and graphite had a liquid-solid ratio of 100 mL:150 mL:1 g; and finally drying the solid material in a vacuum oven at 60° C. for 12 hour to obtain a graphite oxide; homogeneously mixing graphite oxide and phosphorus pentoxide in a mass ratio of 1:2, placing in an argon atmosphere having a flow rate of 300 mL/min, heating to 900° C. at an increasing rate of 15° C./min, maintaining for 2 h, then decreasing the temperature to room temperature in an argon atmosphere having a flow rate of 300 mL/min to obtain a phosphorus-doped graphene.

The Raman spectrum determination of nitrogen-doped graphene prepared in Comparison Example 6 showed that the G peak and D peak had a peak height ratio of 5.

It was determined by the "first method for determining the non-carbon non-oxygen element content" that the phosphorus-doped graphene primarily comprised P in an amount of 2 wt %.

COMPARISON EXAMPLE 7

An active carbon/graphene composite was prepared from organic biomass by the following steps:

(1) weighing raw materials of each component according to the following mass percents of: 45% stalk particles, 50% melamine, and 5% ferric nitrate;
(2) homogeneously mixing the above components, placing into a furnace having a temperature of 300° C. and heating for 3 h to obtain a grey bulk material having a fluffy structure;
(3) placing the above bulk material into a furnace having a temperature of 600° C. and fed with nitrogen, heating for 10 min to obtain an active carbon/graphene composite.

It was determined by the "first method for determining the non-carbon non-oxygen element content" that the active carbon/graphene composite primarily comprised elements of P, Si, Ca, Fe, Mg and Mn. The specific content can be referred to Table 1 which shows the performance testing results of the examples and comparison examples of the present application.

The data of Examples 1-12 and Comparison Examples 1-4 can be referred to Table 1; and the data of Examples 13-22 and Comparison Examples 5-7 can be referred to Table 2.

TABLE 1

| Examples | The contents of P, Si, Ca, Al and Na in the composite, wt % | Far-infrared (normal emissivity) | Antibacterial rate, % |
|---|---|---|---|
| Example 1 | 0.5 | 0.85 | 95 |
| Example 2 | 1 | 0.88 | 96 |
| Example 3 | 0.96 | 0.88 | 96 |
| Example 4 | 1.24 | 0.89 | 97 |
| Example 5 | 0.6 | 0.86 | 96 |
| Example 6 | 2 | 0.90 | 98 |
| Example 7 | 2.8 | 0.90 | 99 |
| Example 8 | 1.6 | 0.88 | 97 |
| Example 9 | 0.8 | 0.85 | 95 |
| Example 10 | 3.2 | 0.90 | 99 |
| Example 11 | 3.8 | 0.89 | 99 |
| Example 12 | 4.3 | 0.85 | 95 |
| Comparison Example 1 | 0.3 | 0.83 | 90 |
| Comparison Example 2 | 2 | 0.83 | 65 |
| Comparison Example 3 | 0 | 0.40 | 95 |
| Comparison Example 4 | 8 | 0.7 | 30 |

It can be seen from Table 1 that the far-infrared and antibacterial properties of the obtained composites having a carbon nanostructure prepared using the porous cellulose prepared in Example 4 are superior to those prepared using ordinary cellulose in Examples 2 and 3. It can be seen from Example 12 that the far-infrared and antibacterial properties were significantly decreased when the first non-carbon non-oxygen element has a content of higher than 4 wt %. As can be seen from Comparison Example 1, the first non-carbon non-oxygen element prepared by using biomass as raw material is lower than 0.5 wt %, the far infrared and antibacterial effects were not very good. In Comparison Example 2, although the phosphorus element exceeded 0.5 wt %, the deliberate introduction during the preparation process results in that the far-infrared and antibacterial properties are not very satisfactory. In Comparison Example 3, the first non-carbon non-oxygen element content is almost 0; the far-infrared effect is very poor, and the antibacterial effect is acceptable.

TABLE 2

| Examples | Sum of the contents of non-carbon non-oxygen elements, wt % | Far-infrared (normal emissivity) | Antibacterial rate, % |
|---|---|---|---|
| Example 13 | 4.5 | 0.92 | 95 |
| Example 14 | 4.3 | 0.91 | 97 |
| Example 15 | 4.6 | 0.92 | 98 |
| Example 16 | 1.3 | 0.86 | 96 |
| Example 17 | 3.96 | 0.88 | 96 |
| Example 18 | 5.24 | 0.89 | 97 |
| Example 19 | 1.6 | 0.81 | 85 |
| Example 20 | 2.3 | 0.82 | 88 |
| Example 21 | 2.8 | 0.82 | 89 |
| Example 22 | 4.6 | 0.84 | 92 |
| Comparison Example 5 | 0.3 | 0.77 | 66 |
| Comparison Example 6 | 2 | 0.75 | 65 |
| Comparison Example 7 | 7 | 0.70 | 75 |

As can be seen from Table 2, when the non-carbon non-oxygen element content is lower than 0.5 wt % in Comparison Example 5, the far-infrared and antibacterial effects are not very good. In Comparative Example 6, although the phosphorus element exceeds 0.5 wt %, the far-infrared and antibacterial properties are not very satisfactory either since there is a single element. In Comparative Example 7, when the content of non-carbon non-oxygen elements is more than 6 wt %, the far-infrared and antibacterial properties decreased significantly.

From the above examples and comparison examples, it is found that the present invention achieves excellent far-infrared effect and antibacterial and bacteriostatic effects by controlling the content of non-carbon non-oxygen elements in the composite.

The properties of the composites prepared in Examples 7-9 and 13-15 were tested for pH value, conductivity, specific surface area, diameter and C/O ratio, and the results are shown in Table 3.

TABLE 3

| Examples | Conductivity, S/m | Specific surface area, $m^2/g$ | C/O ratio |
|---|---|---|---|
| Example 7 | 6000 | 280 | 46 |
| Example 8 | 6500 | 250 | 47 |
| Example 9 | 6300 | 260 | 47 |
| Example 13 | 5500 | 200 | 46 |
| Example 14 | 5700 | 220 | 47 |
| Example 15 | 2800 | 210 | 46 |

EXAMPLE 23

A viscous fiber was prepared using the composite having a carbon nanostructure prepared in Example 1, comprising:
taking corn cobs as raw material, alkali impregnating, squeezing, pulverizing, aging, yellowing, dissolving and curing to prepare a viscose having a solid content of 8%, dispersing the composite having a carbon nanostructure prepared in Example 1 in a 5-fold mass of water to obtain a dispersion with a graphene structure, blending the dispersion with a graphene structure with the viscose, stirring for 1 hour in a high-speed mixer to form a blend solution, wherein the composite having a carbon nanostructure was in an amount of 3% of the fiber mass, filtering, defoaming, and then spinning, desulfurizing, water washing, drying to obtain a functional viscous fiber, wherein the coagulation bath comprised: 105 g/L of sulfuric acid, 200 g/L of sodium sulfate, and 12 g/L of zinc sulfate.

The far-infrared performance and antibacterial property of the functional fiber were tested. The results showed that the far-infrared normal emissivity of the viscous fiber was 0.92, and the antibacterial property thereof was 95%.

The composite having a carbon nanostructure added therein could be utilized directly to achieve better effects without pre-activation or modification.

Infrared detection data were tested based on FZ/T64010-2000 Test method by National Quality Supervision and Inspection Center of textile products.

Antibacterial test data were tested based on GB/T20944.3-2008 Test method by National Quality Supervision and Inspection Center of textile products.

EXAMPLE 24

A polyurethane foam was prepared using the composite having a carbon nanostructure prepared in Example 1, comprising the following steps:
(1) adding 5 parts by weight of the composite having a carbon nanostructure obtained in Example 1 into 100 parts by weight of polyether polyol, and further adding 3 parts by weight of methylphenylsilicone oil, 2 parts by weight of dimethylethanolamine, 6 parts by weight of water, stirring and homogeneously mixing to obtain a polyether polyol monomer composition;
(2) adding 50 parts by weight of polyisocyanate to the polyether polyol monomer composition of step (1), and mixing homogeneously;
(3) pouring the mixture in step (2) into a mold for foaming and solidifying to obtain a functional polyurethane foam.

The far-infrared performance and antibacterial property of the functional polyurethane foam were tested. The results showed that the far-infrared normal emissivity of the polyurethane foam was 0.88, and the antibacterial property thereof was 90%.

The composite having a carbon nanostructure added therein could be utilized directly to achieve better effects without pre-activation or modification.

Performance Tests:

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking *Staphylococcus aureus* as examples.

EXAMPLE 25

A composite polyester material was obtained by the following methods:
(1) homogeneously mixing 100 g of the composite having a carbon nanostructure prepared in Example 1 with 8.52 kg of PTA and 3.5 of ethylene glycol, ball-milling for 20 min and then directly introducing into a beating reactor for beating for 30 min; polymerizing according to a three-pot PET polymerization process to obtain a melt after polymerization;
(2) discharging the melt under the conditions of cooling water at 40° C. and a drawing speed of 0.5 m/s, directly pelletizing to obtain a functional PET material.

The far-infrared performance and antibacterial property of the functional polyester materials were tested. The results showed that the far-infrared normal emissivity of the PET material was 0.89, and the antibacterial property thereof was 91%.

The composite having a carbon nanostructure added there could be utilized directly to achieve better effects without pre-activation or modification.

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking *Staphylococcus aureus* as examples.

The explanations of the aforesaid examples are just for understanding the process and core concepts of the present invention. Without departing from the principles of the present invention, those skilled in the art can make several improvements and modifications to the present invention, which also fall within the protection scope of the claims of the present invention.

The applicant declares that the present invention discloses the detailed technological equipment and process of the present invention via the aforesaid examples. However, the present invention is not limited by the aforesaid detailed technological equipment and process. That is to say, it does not mean that the present invention cannot be carried out unless the aforesaid detailed technological equipment and process are carried out. Those skilled in the art shall know that any improvement, equivalent replacement of the parts of the present invention, addition of auxiliary parts, selection of specific modes and the like all fall within the protection scope and disclosure of the present invention.

The invention claimed is:

1. A composite having a carbon nanostructure, the composite comprising:
   graphene;
   amorphous carbon; and
   a non-carbon non-oxygen element comprising elements of Fe, Si, and Al,
   wherein the non-carbon non-oxygen element is present in an amount of 0.5 wt %-6 wt % of the composite;
   wherein the non-carbon non-oxygen element further comprises P, Ca, and Na;
   wherein the non-carbon non-oxygen elements P, Si, Ca, Al and Na in the composite having a carbon nanostructure are introduced through carbon sources.

2. The composite according to claim 1, wherein a G peak and a D peak of carbon element of the composite in a Raman spectrum has a peak height ratio of 1-20.

3. The composite according to claim 1, wherein the composite further has a 2D peak in a Raman spectrum.

4. The composite according to claim 1, wherein the non-carbon non-oxygen elements P, Si, Ca, Al and Na in the composite having a carbon nanostructure are introduced through biomass carbon sources.

5. The composite according to claim 1, wherein the non-carbon non-oxygen element further comprises any one element selected from the group consisting of Ni, Mn, K, Mg, Cr, S, and Co, or a combination of at least two selected therefrom.

6. The composite according to claim 1, wherein the non-carbon non-oxygen element exists in a form of simple substance and/or compound.

7. The composite according to claim 1, wherein the non-carbon non-oxygen element is adsorbed on the surface of or inside the carbon nanostructure in any one or more form selected from the group consisting of simple substance, oxides and carbides.

8. The composite according to claim 1, wherein the composite contains carbon element in an amount of 80 wt % or more.

9. The composite according to claim 1, wherein the composite contains P, Si, Ca, Al, and Na in an amount of 0.5 wt %-4 wt %.

10. The composite according to claim 1, wherein the composite has a far-infrared detection normal emissivity of greater than 0.88.

11. The composite according to claim 1, wherein the graphene has a carbon six-membered ring honeycomb lamellar structure having a thickness of 100 nm or less.

12. The composite according to claim 11, wherein the carbon six-membered ring honeycomb lamellar structure in the composite microscopically shows any one conformation selected from the group consisting of warping, curling and folding, or a combination of at least two selected therefrom.

13. A macromolecular material comprising the composite of claim 1.

14. A process for preparing a composite having a carbon nanostructure of claim 1, the process comprising:
  (1) catalyzing a biomass carbon source under the action of a catalyst to obtain a precursor;
  (2) maintaining the temperature of the precursor at 140° C.-180° C. for 1.5 h-2.5 h under the condition of protective gas to obtain a first intermediate;
  (3) heating the first intermediate to 350° C.-450° C. under the condition of protective gas and maintaining the temperature for 3 h-4 h to obtain a second intermediate;
  (4) heating the second intermediate to 1100° C.-1300° C. under the condition of protective gas and maintaining the temperature for 2 h-4 h to obtain a third intermediate; and
  (5) alkali washing, acid washing and water washing the third intermediate in sequence to obtain a composite;
  wherein the temperatures in steps (3) and (4) are increased at a rate of 14° C./min-18° C./min;
  wherein the composite having the carbon nanostructure comprises:
    graphene;
    amorphous carbon; and
    a non-carbon non-oxygen element comprising elements of Fe, Si, and Al,
    wherein the non-carbon non-oxygen element is present in an amount of 0.5 wt %-6wt % of the composite;
    wherein the non-carbon non-oxygen element further comprises P, Ca, and Na;
    wherein the non-carbon non-oxygen element P, Si, Ca, Al and Na in the composite having a carbon nanostructure are introduced through carbon sources.

15. A process for preparing a composite having a carbon nanostructure of the claim 1, the process comprising:
  (1) mixing a biomass carbon source with a catalyst, stirring, catalyzing and drying to obtain a precursor;
  (2) maintaining the temperature of the precursor at 280° C.-350° C. for 1.5 h-2.5 h under protective atmosphere, then heating by temperature programming to 950-1200° C. at an increasing rate of 15-20° C./min, maintaining the temperature for 3-4 h to obtain a crude product; and
  (3) washing the crude product to obtain a composite having a carbon nanostructure
  wherein the composite having the carbon nanostructure comprises:
    graphene;
    amorphous carbon; and
    a non-carbon non-oxygen element comprising elements of Fe, Si, and Al,
    wherein the non-carbon non-oxygen element is present in an amount of 0.5 wt %-6wt % of the composite;
    wherein the non-carbon non-oxygen element further comprises P, Ca, and Na;
    wherein the non-carbon non-oxygen elements P, Si, Ca, Al and Na in the composite having a carbon nanostructure are introduced though carbon sources.

16. A process for preparing a macromolecular material, comprising compounding the composite of claim 15 with a macromolecular raw material, without any activation or modification of the composite, wherein the macromolecular raw material is any one or more selected from the group consisting of rubber, plastic, fiber, coating, adhesive agent and polymer-based composite materials.

* * * * *